United States Patent
Oβwald

(10) Patent No.: US 9,234,783 B2
(45) Date of Patent: Jan. 12, 2016

(54) APPARATUS AND METHOD FOR SECURING THE CONNECTION OF A COAXIALLY ARRANGED TUBE OF A MEASURING PROBE UNIT OF A FILL-LEVEL MEASURING DEVICE TO A PROCESS CONNECTION ELEMENT

(75) Inventor: Dirk Oβwald, Schopfeim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 410 days.

(21) Appl. No.: 13/812,881

(22) PCT Filed: Jul. 1, 2011

(86) PCT No.: PCT/EP2011/061089
§ 371 (c)(1),
(2), (4) Date: Jan. 29, 2013

(87) PCT Pub. No.: WO2012/013444
PCT Pub. Date: Feb. 2, 2012

(65) Prior Publication Data
US 2013/0127156 A1 May 23, 2013

(30) Foreign Application Priority Data
Jul. 30, 2010 (DE) .......................... 10 2010 038 732

(51) Int. Cl.
*G01F 23/26* (2006.01)
*G01F 23/284* (2006.01)
(52) U.S. Cl.
CPC ............ *G01F 23/284* (2013.01); *G01F 23/263* (2013.01); *G01F 23/268* (2013.01); *Y10T 29/49938* (2013.01)

(58) Field of Classification Search
None
See application file for complete search history.

(56) References Cited

U.S. PATENT DOCUMENTS 4,809,129 A * 2/1989 Hansen et al. ................. 361/284
5,481,197 A * 1/1996 Sanders et al. ................ 324/690
(Continued)

FOREIGN PATENT DOCUMENTS

| DE | 7134268 | 12/1971 |
| DE | 19728657 C1 | 9/1998 |
| DE | 102006030965 A1 | 10/2008 |

OTHER PUBLICATIONS

International Search Report, Sep. 29, 2011, The Netherlands.
(Continued)

*Primary Examiner* — Robert R Raevis
(74) *Attorney, Agent, or Firm* — Bacon & Thomas, PLLC

(57) ABSTRACT

A method and apparatus for connecting a tube coaxially arranged around a measuring probe in a measuring probe unit of a fill-level measuring device comprising: a cable- or rod-shaped measuring probe and a tube coaxially surrounding the measuring probe. The measuring probe unit is connected to the container by means of a process connection element, wherein the measuring probe and the tube arranged coaxially around the measuring probe for the measuring probe unit are connected releasably to the process connection element. The coaxially arranged tube is connected releasably to the process connection element via a shape interlocking, threaded connection in a defined connection region, and the releasable, shape-interlocking, threaded connection of the coaxially arranged tube to the process connection element is secured by means of a radially directed deformation of the coaxially arranged tube in the defined connection region.

10 Claims, 3 Drawing Sheets

(56) References Cited

U.S. PATENT DOCUMENTS

| | | |
|---|---|---|
| 5,943,908 A | 8/1999 | Innes |
| 6,711,801 B2 | 3/2004 | Pulfer |
| 8,040,274 B2 | 10/2011 | Wendler |
| 2006/0225499 A1 | 10/2006 | Gravel |

OTHER PUBLICATIONS

German Search Report, Jun. 7, 2011, Munich.
English translation of IPR, WIPO, Geneva, Feb. 14, 2013.

* cited by examiner

A-A

US 9,234,783 B2

APPARATUS AND METHOD FOR SECURING THE CONNECTION OF A COAXIALLY ARRANGED TUBE OF A MEASURING PROBE UNIT OF A FILL-LEVEL MEASURING DEVICE TO A PROCESS CONNECTION ELEMENT

TECHNICAL FIELD

The present invention relates to method and apparatus for connecting a coaxially arranged tube of a measuring probe unit of a fill-level measuring device.

BACKGROUND DISCUSSION

Known in automation- and process control technology are two different measuring principles, which permit determination of fill level of a medium in a container by means of a measuring probe introduced into the container. The firm of Endress+Hausser is active in the field of industrial automation- and process control technology and manufactures industrial measuring devices, often referred to as field devices. Its field devices that utilize container introduced, measuring probes for fill level determination, respectively limit level determination, of a medium in a container are marketed, for instance, under the marks, LEVELFLEX, LIQUICAP and SOLICAP One of these measuring principles is based on capacitance measurement. In this case, the measuring probe is applied as a capacitive probe, e.g. as an electrode. It is inserted into the container and a capacitance measured for a capacitor formed by the probe and the container wall surrounding the probe. The measured capacitance corresponds to the sum of a basic capacitance of the empty container and the product of a fill substance specific, capacitance increase factor and the fill level of such fill substance.

Another of these measuring principles is based on travel-time measurement. In such case, the fill-level measuring device produces electromagnetic signals, which it sends into the container along a measuring probe serving as a waveguide. A part of these electromagnetic signals is, in turn, reflected back due to a change of the dielectric constant of the medium surrounding the measuring probe at the surface of the fill substance. Such echo signal is received back after a travel time dependent on the fill level. The fill-level measuring device ascertains traveled distance based on the propagation velocity of the measurement signal and the travel-time difference between the transmitting of the measurement signal and the receipt of the echo signal arising from the reflection on the surface of the fill substance. The FMCW method—Frequency Modulated Continuous Waves—, in the case of which the frequency of a continuous measurement signal is continuously changed. Distance is measured using frequency difference between transmitted signal and reflected signal at the moment the reflected signal comes back. The FMCW method is likewise performable as a form of the above travel-time measuring principle with the above described measuring probes as waveguides, surface waveguides or coaxial waveguides.

In the case of time domain reflectometry TDR—Time Domain Reflectometry—, for example, according to the method of the guided microwave, a high-frequency pulse is transmitted along a Sommerfeld waveguide, a Goubau waveguide or a coaxial waveguide. If this electromagnetic signal strikes a surface of the fill substance in the container, then at least a part of the signal is reflected back due to the impedance jump existing at this media boundary. The received signal amplitude as a function of time is the echo signal. Each value of this echo signal corresponds to the amplitude of an echo reflected at a certain distance from the transmitting- and receiving element. The echo signals have marked maxima, which correspond to the portions of the electromagnetic signals, in each case, reflected on the surface of the fill substance. Travel time is ascertained from the time difference between the transmitting of the electromagnetic signal and the receipt of the maxima. Based on the structural dimensions of the measuring arrangement, especially the installed height of the fill-level measuring device in reference to the container, and the propagation velocities of the electromagnetic signals in a medium, e.g. air located above the upper fill substance, there results from the travel time the fill level of the fill substance in the container and therewith the fill level present in the container.

In the following citations, the construction of such measuring probes and the coupling of the measuring signals into these measuring probes are described.

DE 10 2004 060 119 A1 discloses a coupling unit for a time-domain reflectometer, in the case of which the probe element is connected via a threaded connection with the coupling unit of the measuring probe. This construction has the advantage that the probe element can be removed and replaced on-site.

Other combinations of probe elements with coupling units are shown in U.S. Pat. No. 6,178,817 B1, DE 100 45 235 A1 and DE 100 03 941 A1. In the case of this type of measuring probe connection, the probe element is connected with a threaded lug by means of a connecting element outside of the coupling unit, in the process space.

The above described screwed connections of measuring probes are also applicable in the case of a measuring device working according to a capacitive or conductive measuring method. In DE 2003 00 901 U1, a simple measuring probe connection for a capacitive measuring device is described.

Preferably, both for capacitive fill level measurement as well as also for fill level measurement according to the travel time principle, so called coaxial probes are applied as measuring probe units. These comprise an inner conductor as a measuring probe and a tube coaxially surrounding the measuring probe as a shield conductor. Coaxial probes offer the advantage that the measurements executed therewith occur completely independently of the installed situation of the measuring probe in the container. As a result, shape and electrical properties of the container have no influence on the measurement. At the same time, the shielded conductor leads to a maximum signal quality. Influences from external disturbances and loss of power are significantly reduced thereby.

In order to be able to apply such a coaxial probe for a capacitive fill level, measurement and/or a fill level measurement according to the above described travel time principle, it is absolutely necessary that the inner conductor, respectively the measuring probe, be galvanically insulated from the coaxially arranged tube, respectively the shielding conductor and that the shielding conductor lie electrically at a reference potential, preferably ground. For this reason, also in the case of an application in a container filled with an electrically conductive fill substance, there can be no galvanic connection between the inner conductor and the shielding conductor. Such a galvanic connection would lead to a short circuit, which would make both a capacitive fill level measurement as well as also a fill level measurement according to the travel time principle impossible.

According to the state of the art, there are different approaches for achieving releasable, galvanically isolated connections of the measuring probe and the tube arranged coaxially around the measuring probe for the measuring probe unit of a fill-level measuring device. These have, however, the disadvantage that the measuring probe or the coaxially arranged tube can loosen due to vibrations or due to unintended force acting on their connections. If a measuring probe or a tube arranged coaxially around the measuring probe becomes completely detached from its connection to the process connection element, measuring with such measuring probe unit is no longer possible: Furthermore, a dropped measuring probe or a fallen off, coaxial tube of the measuring probe unit in a funnel silo, which has in the lower region, most often, a feed screw or pump, can cause great damage.

Disclosed in DE 10 2006 053 399 A1 is a measuring probe securement by means of a retaining ring or an O-ring, which engages in cavities on the measuring probe and in the measuring probe holder for guarding against accidental release. The engagement of the retaining ring or the O-ring in the cavity in the measuring probe holder can be overcome by application of a predetermined axial tensile force and, thus, the measuring probe can be separated from the process connection element.

A securing against unintentional release of the connection of the tube arranged coaxially around the measuring probe, especially due to arising vibrations of the measuring device or the container, is not shown in the state of the art.

SUMMARY OF THE INVENTION

An object of the invention, therefore, is to provide for a measuring device a coaxial measuring probe unit comprising a measuring probe with a tube coaxially surrounding the measuring probe, wherein a simple, secure and cost effective connection of the galvanically isolated tube coaxially arranged around the measuring probe is enabled.

The object is achieved by a fill-level measuring device, which ascertains and/or monitors a fill level or limit level of a medium located in the process space of a container by means of a microwave, travel time, measuring method and/or a capacitive measuring method and is composed at least of a measurement transmitter and a measuring probe unit. An apparatus of the invention for connecting a tube arranged coaxially around the measuring probe of a measuring probe unit, which is constructed at least of a cable- or rod-shaped measuring probe and a tube arranged coaxially around the measuring probe, wherein connection of the measuring probe unit to the container is embodied by means of a process connection element, wherein the measuring probe and the tube arranged coaxially around the measuring probe for the measuring probe unit are connected to the process connection element via a releasable connection. The releasable connection of the coaxially arranged tube to the process connection element is embodied via a shape interlocking, threaded connection in a defined connection region, and wherein the releasable, shape-interlocking, threaded connection of the coaxially arranged tube to the process connection element is secured by means of a radially directed deformation of the coaxially arranged tube in the defined connection region.

In a supplemental embodiment, the radially directed deformation of the coaxially arranged tube in the defined connection region is provided by external force on the coaxially arranged tube at least in the defined connection region arising from pressure clamps.

In a first embodiment, the radially directed deformation of the coaxially arranged tube in the defined connection region arises from pressure clamps having a polygonal cavity.

In a second embodiment, the radially directed deformation of the coaxially arranged tube in the defined connection region arises from pressure clamps having an oval cavity.

In a third embodiment, the pressure clamps are embodied of at least two parts and/or are equally shaped and arranged mirror symmetrically.

Furthermore, the invention includes a method for connecting a tube arranged coaxially around a measuring probe in a measuring probe unit of a fill-level measuring device, wherein the fill-level measuring device is used for ascertaining and monitoring fill level of a medium located in the process space of a container by means of a microwave, travel time, measuring method and/or a capacitive measuring method, wherein the measuring probe unit comprises a cable- or rod-shaped measuring probe and a tube coaxially surrounding the measuring probe, wherein the measuring probe unit is connected to the container by means of a process connection element, wherein the measuring probe and the tube arranged coaxially around the measuring probe for the measuring probe unit are connected releasably to the process connection element, wherein in a first step the coaxially arranged tube is connected releasably to the process connection element via a shape interlocking, threaded connection in a defined connection region, and wherein in a second method step the releasable, shape-interlocking, threaded connection of the coaxially arranged tube to the process connection element is secured by means of a radially directed deformation of the coaxially arranged tube in the defined connection region.

In an additional method step, the radially directed deformation is effected by force on the coaxially arranged tube arising from pressure clamps.

In a supplemental method step, the pressure clamps produce with a polygonal cavity a pointwise, radially directed deformation of the coaxially arranged tube in the defined connection region.

In a supplemental method step, the pressure clamps produce with an oval cavity an areal, radially directed deformation of the coaxially arranged tube in the defined connection region.

In an additional advantageous method step, the pressure clamps formed of at least two-parts with the corresponding cavity are closed around the coaxially arranged tube in the connection region by means of defined force and thereby occurring, radially directed deformation of the coaxially arranged tube connected in the defined connection region to the process connection element secures against unscrewing of the threaded connection.

BRIEF DESCRIPTION OF THE DRAWINGS

Other details, features and advantages of the subject matter of the invention will become evident from the following description with the associated drawing, in which preferred examples of embodiments of the invention are presented. The components or assemblies of components of the examples of embodiment illustrated in the figures and corresponding in construction and/or function are, for better overview and simplification, provided with equal reference characters. The figures of the drawing show as follows.

DETAILED DISCUSSION IN CONJUNCTION WITH THE DRAWINGS

Figure 1:
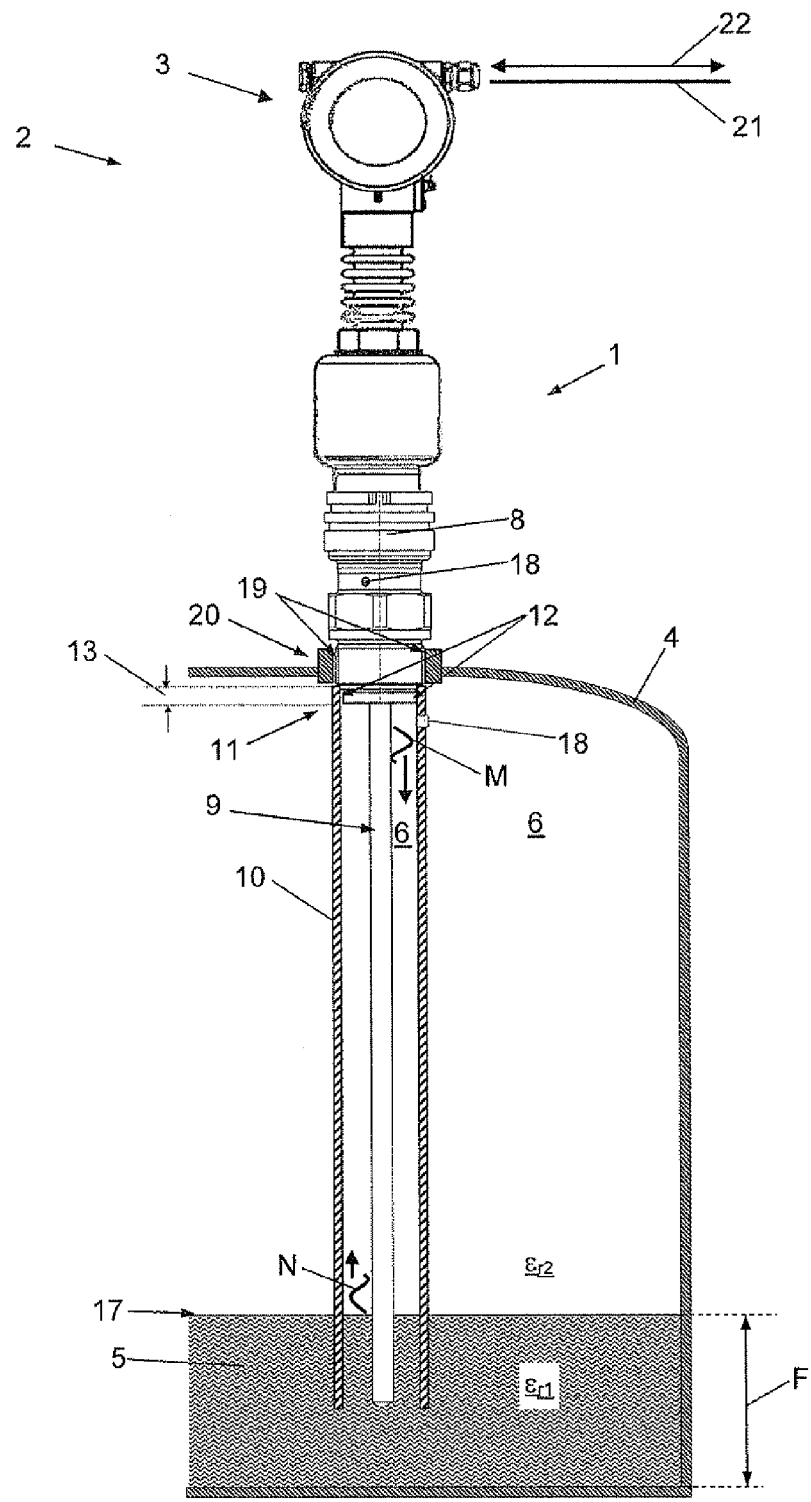
FIG. 1 is a schematic, sectional illustration of a fill-level measuring device of process measurements technology with a measuring probe unit according to the invention.

FIG. 1 shows a fill-level measuring device 2 in the form of a time-domain reflectometer, or TDR measuring system, for ascertaining the continuous fill level F of a medium 5 in the process space 6 of a container 4 based on the travel-time measuring method using a transmission pulse M on a measuring probe unit 7. The process contacting part of a measuring probe 9, which is usually embodied as a rod or a cable, represents, in such case, the measurement-active region of the measuring probe unit 7. The measurement-inactive region of the measuring probe unit 7 serves essentially for holding the measuring probe 9 in a process connection element 8 and for coupling, or supplying, the transmission pulse M into the measuring probe 9. The probe coupling element, respectively the process connection element 8, of the fill-level measuring device 2 is connected, for example, via a process thread 19 with a flange, or process screw-in 20, which, in turn, is attached to the container 6. The part of the measuring probe 9 protruding into the process connection element 8 and the metal wall of the process connection element 8 form a coaxial waveguide in this measurement-inactive region of the measuring probe unit 7. It is naturally also possible to integrate a special outer conductor in the process connection element 8.

Via the process connection element 8 embodied as a coaxial system, the high-frequency measurement signal produced in a high frequency unit in the measurement transmitter 3 is coupled as transmission pulse M into the measuring probe 9. This coaxial system in the measurement-inactive region of the measuring probe unit 7 is so embodied that the transmission pulse M in this coaxial system can be coupled in and out and transmitted almost loss-free. The wanted echo signals N, reflected at least partially due to changes of the wave resistance, travel back on the measuring probe 9 and are received by the measuring electronics, in particular the high frequency unit, in the measurement transmitter 3. The measuring probe unit 7 is shown in FIG. 1 as a coaxial measuring probe unit 7 composed of a measuring probe 9 and a tube, respectively tubular outer conductor, 10 coaxially surrounding the measuring probe 9. These coaxial measuring probe units 7 have, as already mentioned, the advantage that capacitive fill-level measurements and fill-level measurements by means of guided microwaves occur completely independently of the installed situation of the measuring probe unit 7 in the container 4. As a result, shape and electrical properties of the container 4 have no influence on the measuring of the fill level according to either of the two measuring methods. Combined with this, the presence of the outer conductor leads to a maximum of signal quality, since the shielding by means of the outer conductor 10 can significantly reduce electromagnetic influencing of the measurement signal resulting from external disturbances, foreign radiation and loss powers.

The TDR-measuring method works according to the following measuring principle. High-frequency measuring signals are transmitted via the measuring probe 9 as a transmission pulse M toward the medium 5, respectively into the process space 6. This transmission pulse M is reflected back either as wanted echo signal N due to a DK value jump, respectively a discontinuity of the dielectric constant $\epsilon r$, of the material, or medium, 5 surrounding the measuring probe 9 or partially as disturbance echo signal due to a change of the geometry of the measuring probe 9. A discontinuity of the dielectric constant $\epsilon r$, respectively of the wave resistance, occurs, for example, at the interface 17 of the medium 5, when the dielectric constant $\epsilon r2$ of the gas phase (especially in the case of air, $\epsilon r2$ equals 1) above the medium 5 is smaller than the dielectric constant $\epsilon r1$ of the medium 5. Using the measured travel time and knowledge of the propagation velocity of the high-frequency measurement signal, a conversion formula leads to the distance traveled one way. The fill level F of the medium 5 in the container 4 corresponds to the height of the container 4, respectively the site of the coupling of the high-frequency measuring signals into the measuring probe 7, minus the distance traveled by the high-frequency measuring signals one way. Taking into consideration the geometry of the container 4, then the fill level F of the medium 5 is ascertained in the form of a relative or absolute value. In order that the medium 3 can rise in the tube 10 in keeping with the fill level F, at least one opening 18 is placed in the tube 10 and/or in the process connection element 8.

The received high-frequency measuring signals, composed of wanted echo signals N, transmission pulses M and disturbance echo signals, are, moreover, evaluated metrologically and signal-technically in a control/evaluation unit in the measurement transmitter 3, for example, by filtering, time-transforming and smoothing. The so obtained measured value of the fill level F or an echo curve mapping the entire measuring situation are forwarded, for example, via a bus interface, to the fieldbus 22 and then, for example, to a control station and/or other field devices. The measured value of the fill level 2 or the echo curve can, however, also be presented on an integrated display or an output/input unit of the fill-level measuring device 2. The energy supply of the fill-level measuring device 2 is implemented, for example, by means of a two-wire line. An additional supply line 21 for energy supply is absent, when the fill-level measuring device 2 is a so called two-conductor, measuring device, in which case the communication via the fieldbus 22 and the energy supply via the supply line 21 are combined and cared for exclusively and simultaneously via one two-wire line. The data transmission, respectively communication, via the fieldbus 22 is implemented, for example, according to the CAN-, HART-, PROFIBUS DP-, PROFIBUS FMS-, PROFIBUS PA-, or FOUNDATION FIELDBUS- standard.

The connection system of the invention for securing the coaxial tube 10 of the measuring probe 9 to the process connection element 8 is applicable, for example, also in the case of a fill-level measuring device 2 working according to a capacitive measuring method. With the capacitive measuring method, options include both a continuous measuring of fill level F as well as also the signaling of reaching a predetermined limit level of a medium 5. In such case, the coaxial measuring probe unit 7 composed of a measuring probe 9 and the tube 10 coaxially surrounding the measuring probe 9 forms a capacitor, whose capacitance is dependent on the fill level F of the dielectric medium 5 in the container 4. The fill level F can be deduced from the change of capacitance. When the degree of covering of the measuring probe unit 7 with the medium 5, respectively the fill level F of the medium 5 in the container 4, changes, an almost proportional change of the capacitance of this measurement structure can be detected. An approximately analogous measuring principle is based on a conductive measuring method, in the case of which the change of conductivity is ascertained as a function of the fill level of a conductive medium in the container. Various examples of embodiments for measuring the capacitance are described, for example, in the Offenlegungsschrifts DE 101 57 762 A1 and DE 101 61 069 A1 of the assignee. Usually, for measuring the value of capacitance, the measuring probe unit 7 is supplied with an operating signal, which is, most often, an alternating voltage. The measuring probe 9 is usually embodied either as a rod or as a cable.

Before mounting the fill-level measuring device 2 on the flange or process screw fitting on the container 4, there is connected to the process connection element 8, by means of a connection 11, first the measuring probe 9 and, thereafter, the tube 10 arranged coaxially around the measuring probe 9. The connection 11 is provided, for example, in the form of a threaded connection 12 by means of a thread on the measuring probe 9 and a thread on the process connection element 8 in a defined connection region 13.

In DE 10 2006 053 399 A1, the measuring probe 9 is secured by means of a retaining ring or an O-ring, which, for securing against unintended release, engages in cavities on the measuring probe 9 and in the process connection element 8. By application of a predetermined axial tensile force, this securement can be overcome and, thus, the measuring probe 9 can be separated from the process connection element 8. An unintentional release of the measuring probe 9 held in the process connection element 8 by the threaded connection due to vibrations and shakings is prevented by this securement element in the form of a retaining ring.

Figure 2:
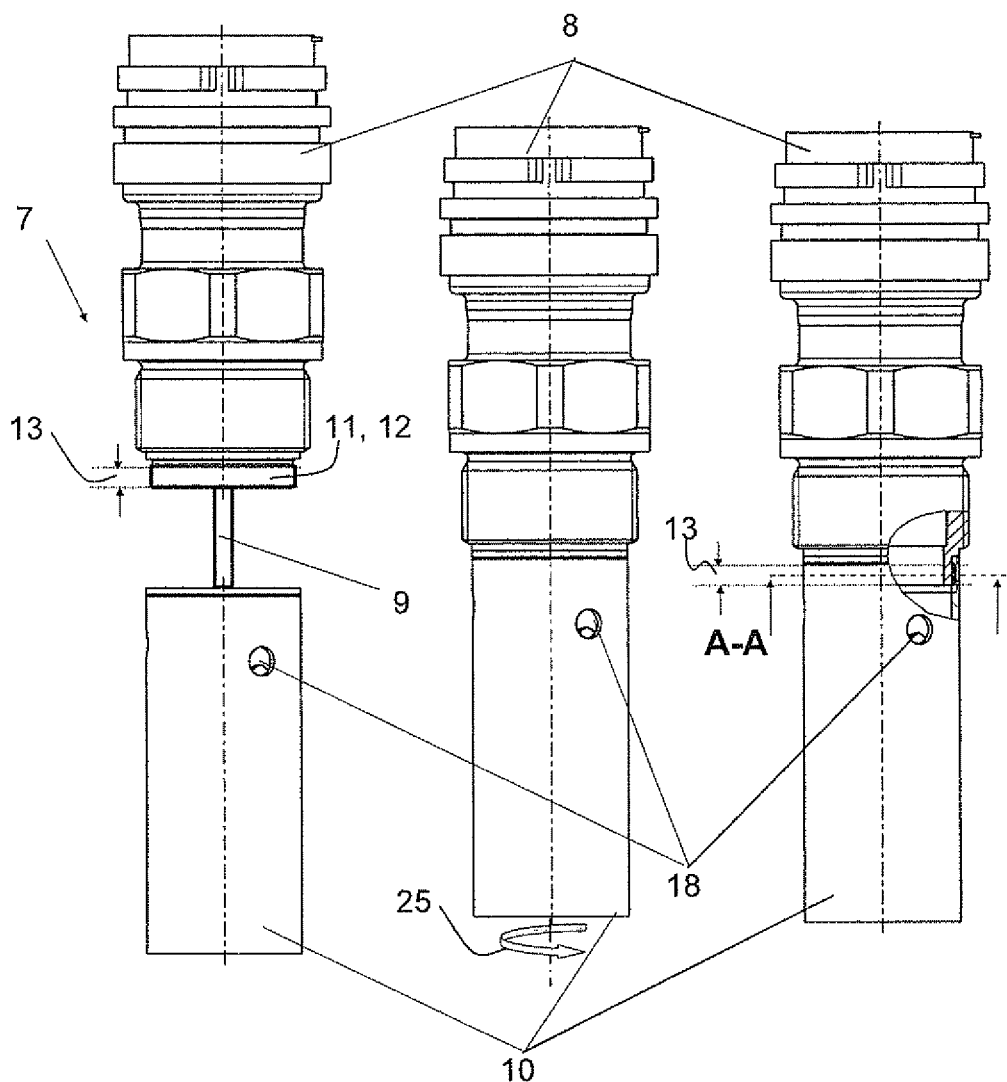
FIG. 2 is a series of representations of the measuring probe unit composed of process connection element, measuring probe and tube arranged coaxially around the measuring probe.
Figure 3:
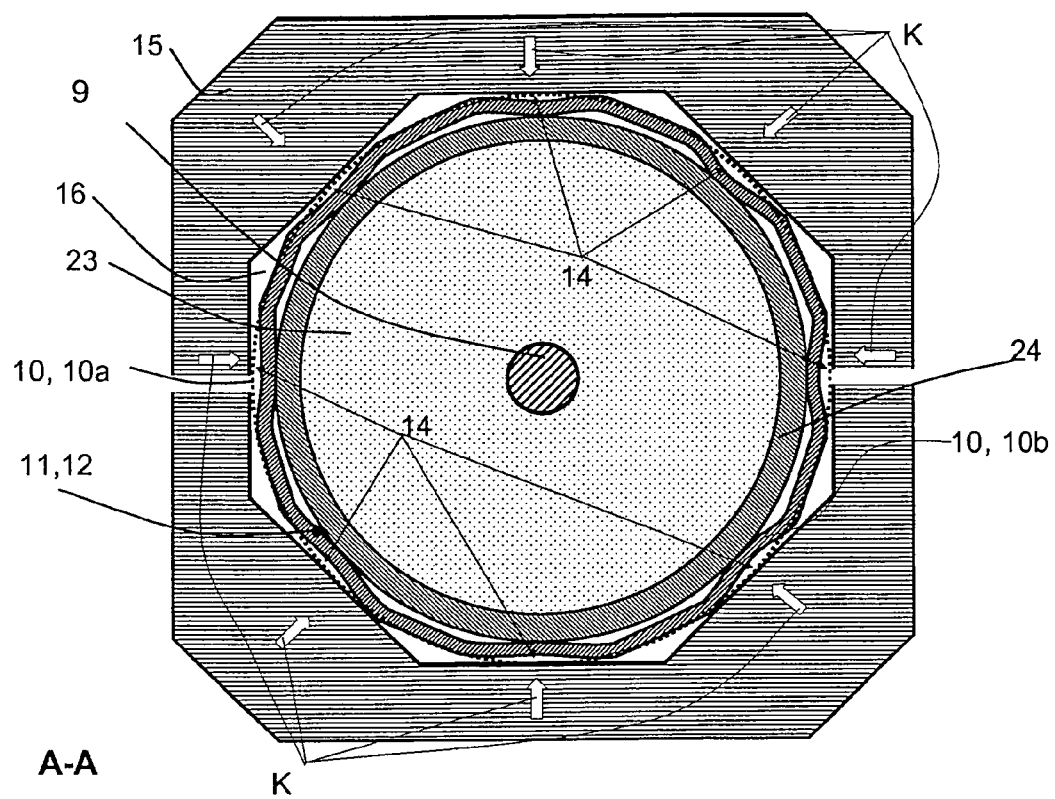
FIG. 3 is a sectional illustration A-A taken according to the indication in FIG. 2 of the connection of the invention by the deformation of the tube in the connection region of the process connection arising from pressure clamps.

The securement of the invention for the tube 10 arranged coaxially around the measuring probe 9 is shown in FIGS. 2 and 3. After the measuring probe 9 is connected and secured in the process connection element 8, the tube arranged coaxially around the measuring probe 9 is connected to the process connection element 8 by means of a rotational movement 25 to engage the threaded connection 12 of connection 11. For simpler connecting of the tube 10 to the process connection element 8, it is provided that the screw thread on the process connection element 8 and the screw thread in the tube 10 have the same nominal diameter, the same number of threads, the same pitch and the same flank form. Since this threaded connection can loosen due to vibrations and differences in the thermal expansions of the materials, according to the invention, an additional securement of the threaded connection 12 is provided. For securement of the free moving, shape-interlocking, threaded connection 12 between the screw thread on the process connection element 8 and the screw thread in the tube 10, it is provided according to the invention in a connection region 13 that the individual screw threads are tightened against one another by an at least partial deformation 14 of the cross section of the tube 10, so that, in the deformed regions of the threads, the thread flanks are pressed on one another. Such a threaded connection is referred to in the technical language as a "frozen" threaded connection, since it can only be loosened, if at all, with exertion of a large amount of force. Due to the increased contact forces between the deformed thread flanks of the two screw threads, it is also possible that it comes to a partial, material bonded, cold welding between the material of the tube 10 and the material of the process connection element 8.

FIG. 3 shows a section taken along the cutting plane A-A of FIG. 2 illustrating the securement of the invention for the threaded connection between the tube 10 and the process connection element 8. The measuring probe 9 is centrally connected and secured in the process connection element 8. The measuring probe 9 is positioned galvanically isolated by an insulating element 23 from the metal housing 24 of the process connection element 8. The tube 10 is arranged coaxially around the measuring probe 9 and connected to the process connection element 8 by means of a threaded connection 12 of threads, which are not shown explicitly in FIG. 3. For securing the threaded connection by the deformation 14, pressure clamps 15 having, together, a, for example, octagonal cavity are used, which are placed in the opened state closely around the tube 10 in the connection region 13. By applying compressive force on the pressure clamps 15, there acts, then, defined, concentrated and radially directed forces K on the circularly round tube 10, 10a with the screw thread. The concentrated action of the forces K deforms the tube 10, 10b in the connection region 13 and the threaded connection 12 between the screw thread on the process connection element 8 and the screw thread on the tube 10 becomes clamped together. The deformation 14 of the tube 10b is shown magnified in FIG. 3.

Figure 4:
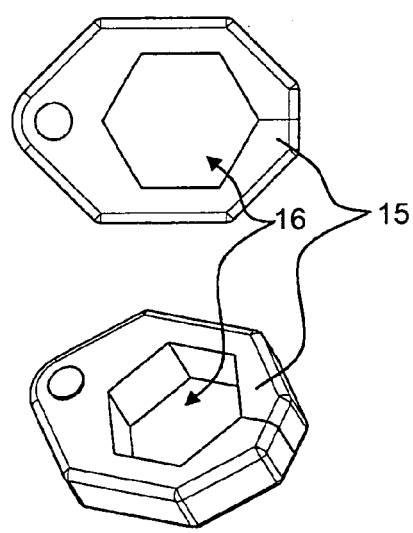
FIG. 4 is an enlarged plan view and an enlarged, three-dimensional representation of the polygonal pressure clamps for securing the releasable, shape-interlocking, threaded connection of the coaxially arranged tube to the process connection element by means of a radially directed deformation.

FIG. 4 shows an embodiment of the pressure clamps 15 with a hexagonal cavity 16. The pressure clamps 15 are unilaterally articulated with one another in this embodiment, so that the pressure clamps 15 can be moved apart only on the other side. For obtaining the force K with these pressure clamps 15, known compact pressing tools, or pressing machines, for instance those sold under the mark Pressgun, can be applied.

The invention claimed is:

1. An apparatus for connecting a coaxially arranged tube of a measuring probe unit of a fill-level measuring device, embodied for ascertaining and monitoring a fill level of a medium located in the process space of a container by means of a microwave, travel time, measuring method and/or a capacitive measuring method, the fill-level measuring device includes: at least a measurement transmitter; and a measuring probe unit, wherein the measuring probe unit is constructed at least of a cable- or rod-shaped measuring probe and a tube arranged coaxially around the measuring probe, wherein connection of the measuring probe unit to the container is embodied by means of a process connection element, and wherein the measuring probe and the tube arranged coaxially around the measuring probe for the measuring probe unit are connected to the process connection element via a releasable connection, the apparatus comprising:
said releasable connection of the coaxially arranged tube to the process connection element, said releasable connection is embodied via a shape interlocking, threaded connection in a defined connection region, wherein:
said releasable, shape-interlocking, threaded connection to the process connection element is secured by means of a radially directed deformation of the coaxially arranged tube in the defined connection region.

2. The apparatus as claimed in claim 1, further comprising: at least one pressure clamp, wherein:
said radially directed deformation of the coaxially arranged tube in said defined connection region is provided by external force on the coaxially arranged tube at least in the defined connection region arising from said at least one pressure clamp.

3. The apparatus as claimed in claim 2, wherein:
the radially directed deformation of the coaxially arranged tube in said defined connection region arises from said at least one pressure clamp having a polygonal cavity.

4. The apparatus as claimed in claim 2, wherein:
the radially directed deformation of the coaxially arranged tube in said defined connection region arises from said at least one pressure clamp having an oval cavity.

5. The apparatus as claimed in claim 2, wherein:
said at least one pressure clamp is embodied of at least two parts and/or are at least equally shaped and arranged mirror symmetrically.

6. A method for connecting a tube arranged coaxially around a measuring probe in a measuring probe unit of a fill-level measuring device, wherein the fill-level measuring device is used for ascertaining and monitoring the fill level of a medium located in the process space of a container by means of a microwave, travel time, measuring method and/or a capacitive measuring method, wherein the measuring probe unit comprises a cable- or rod-shaped measuring probe and a tube coaxially surrounding the measuring probe,
the measuring probe unit is connected to the container by means of a process connection element, and
the measuring probe and the tube are connected releasably to the process connection element, comprising the steps of:
the coaxially arranged tube is releasably connected to the process connection element via a shape interlocking, threaded connection in a defined connection region; and
the releasable, shape-interlocking, threaded connection of the coaxially arranged tube to the process connection element is secured by means of a radially directed deformation of the coaxially arranged tube in the defined connection region.

7. The method as claimed in claim 6, wherein:
the radially directed deformation is effected by force on the coaxially arranged tube arising from pressure clamps.

8. The method as claimed in claim 7, wherein:
the pressure clamps produce with a polygonal cavity a pointwise, radially directed deformation of the coaxially arranged tube in the defined connection region.

9. The method as claimed in claim 7, wherein:
the pressure clamps produce with an oval cavity an areal, radially directed deformation of the coaxially arranged tube in the defined connection region.

10. The method as claimed in claim 7, wherein:
the pressure clamps formed of at least two-parts with the corresponding cavity are closed around the coaxially arranged tube in the connection region by means of defined force and thereby occurring, radially directed deformation of the coaxially arranged tube in the defined connection region to the process connection element secures against unscrewing of the threaded connection.

* * * * *